W. BULLOCK.
Delivering Apparatus.
No. 5,887. Reissued May 26, 1874.
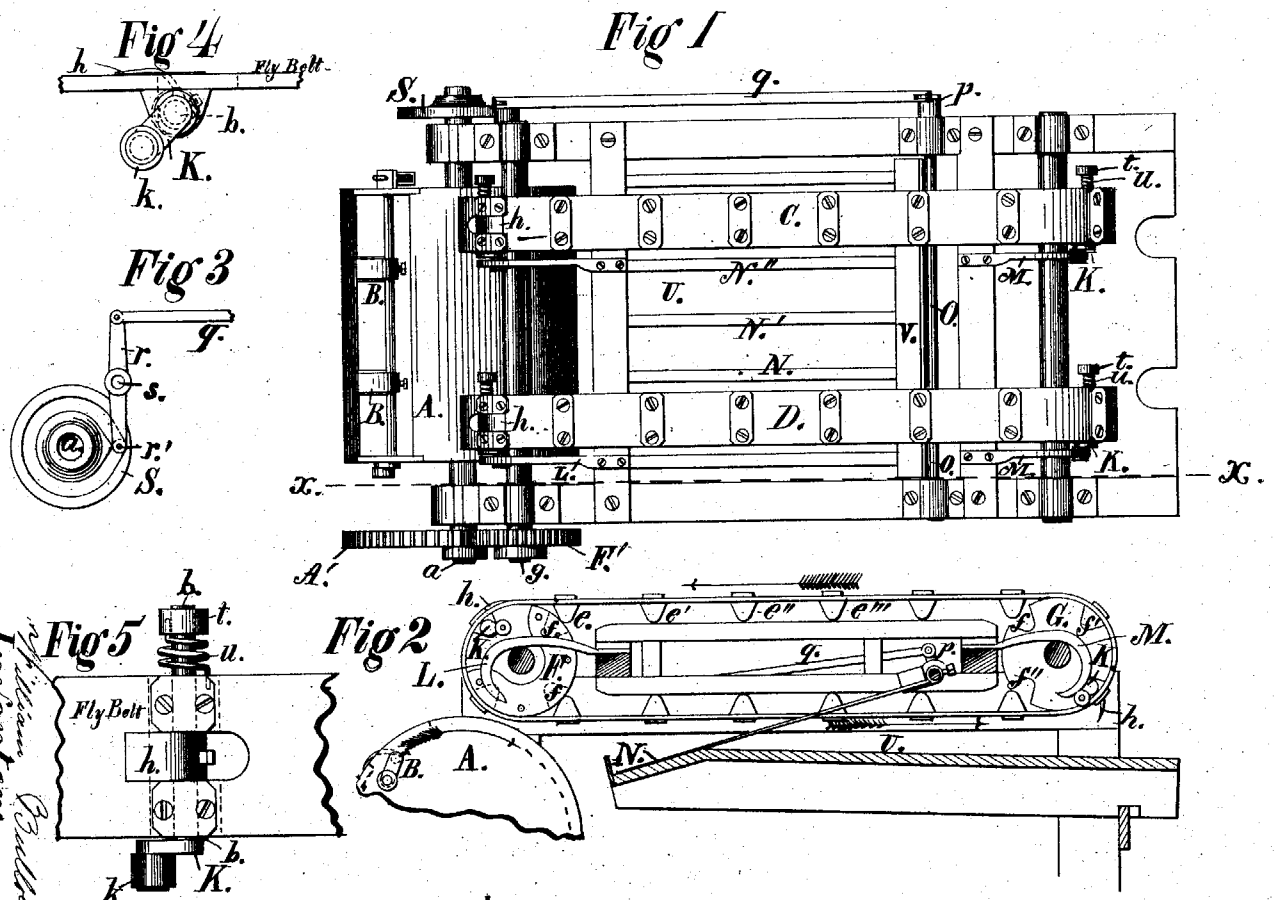
Witnesses:
Stanley Williams
L. E. Montgomery.
William Bullock
Inventor:
Richard Cox Adams
By Attorney

BEST AVAILABLE COPY

UNITED STATES PATENT OFFICE.

RICHARD VOSE, OF NEW YORK, N. Y., ADMINISTRATOR OF WILLIAM BULLOCK, DECEASED.

IMPROVEMENT IN DELIVERY APPARATUS.

Specification forming part of Letters Patent No. 61,996, dated February 12, 1867; reissue No. 5,887, dated May 26, 1874; application filed February 3, 1874.

*To all whom it may concern:*

Be it known that WILLIAM BULLOCK, deceased, late of Philadelphia, in the county of Philadelphia and State of Pennsylvania, did invent certain Improvements in Delivery Apparatus for Rotary Printing-Presses, of which the following is a specification:

The object of the said invention is to remove and pile rapidly printed sheets of paper from rotary printing-presses. The nature of the said invention will appear from the following description, in which reference is made to the accompanying drawings, in which—

Figure 1 represents a plan view of so much of a rotary printing-machine as contains the improved mechanism. Fig. 2 is a vertical section thereof, made as indicated by the broken lines *x x* in Fig. 1; Fig. 3, a side view in detail of the cam S, lever *r*, and part of the connecting-rod *q*, employed in operating the fly-fingers N N′ N″; Fig. 4, an edge view, in detail, of a portion of one of the fly-belts, and an end view of a nipper-spindle with its crank and pin, illustrating the manner in which the nippers *h h* are operated; and Fig. 5, a plan view of a portion of a fly-belt, showing one of the nippers *h*, with the crank K, with its pin *k*, and the spiral spring *w* upon the nipper-spindle.

The roller or cylinder A may be the printing-cylinder, or merely an additional cylinder, provided with vibratory nippers B B, which, by appropriate mechanism, are made to close upon and hold the sheet either before or after it is printed, while the cylinder carries it forward in the direction indicated by the arrow on the end of that portion of the cylinder A shown in Fig. 2, until its forward end reaches, and is taken hold of by, the nippers *h h* upon the endless india-rubber or leather belts C D. The belts are provided on their inner sides with teeth or ribs *e e′ e″ e‴*, &c., which fit into corresponding indentations *f f′ f″ f‴* on the pulleys F G, which are mounted, as shown, upon their respective shafts, having bearings in the main frame. Motion is imparted to these belts by the cylinder A, by means of the cog-wheel A′ on the same shaft with it, which gears with the like wheel F′ on the shaft *g* of the pulley F. Each belt is provided with a pair of nippers, *h h*, located as shown, and which are mounted upon spindles, each of which passes through, and is supported by, one of the teeth before mentioned; and upon each spindle *b* is seated a spiral spring, *u*, one end of which is inserted into the collar *t* of the spindle, while the other is inserted into the tooth, as shown. The spring is so mounted that it exerts a constant force to hold the nipper closed upon the belt, but, by means of the cams L and M, and the crank K and pin *k* on the spindle *b*, this force is overcome, and the nippers opened precisely as and when required.

Now, referring to Fig. 2, it will be seen that the belt D in traveling over the pulleys will open the nippers *h* on the left of the figure as the pin *k* passes around the curve of the cam L, and, at the instant it passes the point of the cam, the nipper is closed by the spring just in time to take hold of the forward end of the sheet, and will hold it until its crank-pin strikes the point of cam M, by which the nipper will be opened, and will let go the sheet when it is just over the fly-board U, at which time the other pair of nippers will be nearing cam L in order to seize the forward end of another sheet.

In order, however, that the rear end of the sheet, after it shall have been drawn sufficiently far forward, shall fall quickly upon the fly-board, and out of the way of the succeeding sheet, the fly-frame, consisting of the wooden fingers N N′ N″, the cross-piece V, and attached to the shaft O O, which has its bearings in the main frame, is constructed as shown. That shaft is provided with a crank, *p*, and by means of the connecting-rod *q*, lever *r*, and cam S, the shaft O O is made to vibrate the fly-frame. The cam S is on the same shaft with cylinder A, and is so arranged that the fly-fingers shall knock the rear end of the sheet down upon the pile upon the fly-board at the instant required, and then move quickly upward again, so that their points may clear the forward end of the succeeding sheet.

What I claim as the invention of the said WILLIAM BULLOCK, deceased, is—

1. The nippers *h* and *h*, mounted, respectively, on the spindles *b* and *b*, each of such spindles having its bearings in a ridge or rib of the endless belt, substantially as and for the purpose shown, described, and set forth.

2. The combination of one or more endless belts, C and D, carrying nippers *k* and *h*, each of which is mounted upon its own spindle *b*, the latter having its own bearing in a rib or ridge of the belt, and the described vibrating fly-frame for throwing down the sheet and arresting its motion, substantially as shown and described, for the purpose set forth.

RICHD. VOSE,
*Administrator of estate of*
*Wm. Bullock, deceased.*

Witnesses:
JNO. C. GUIBERT,
WM. R. PALMER.